March 24, 1942.  G. KENDE ET AL  2,277,233
CAMERA
Filed Jan. 6, 1939  3 Sheets-Sheet 1

INVENTORS
GEORGE KENDE
PHILIP J. BROWNSCOMBE
BY
ATTORNEY

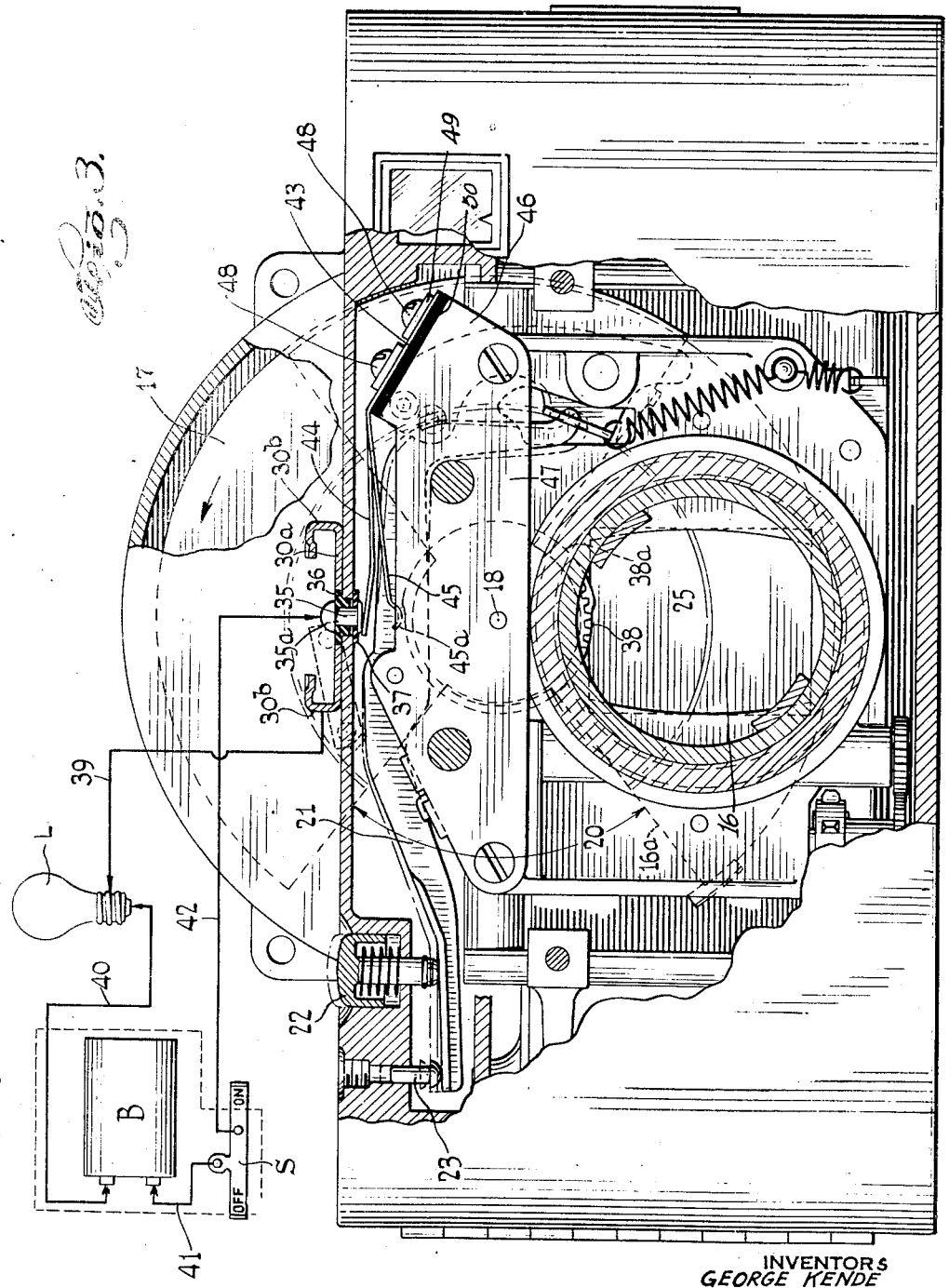

March 24, 1942.  G. KENDE ET AL  2,277,233
CAMERA
Filed Jan. 6, 1939   3 Sheets-Sheet 3
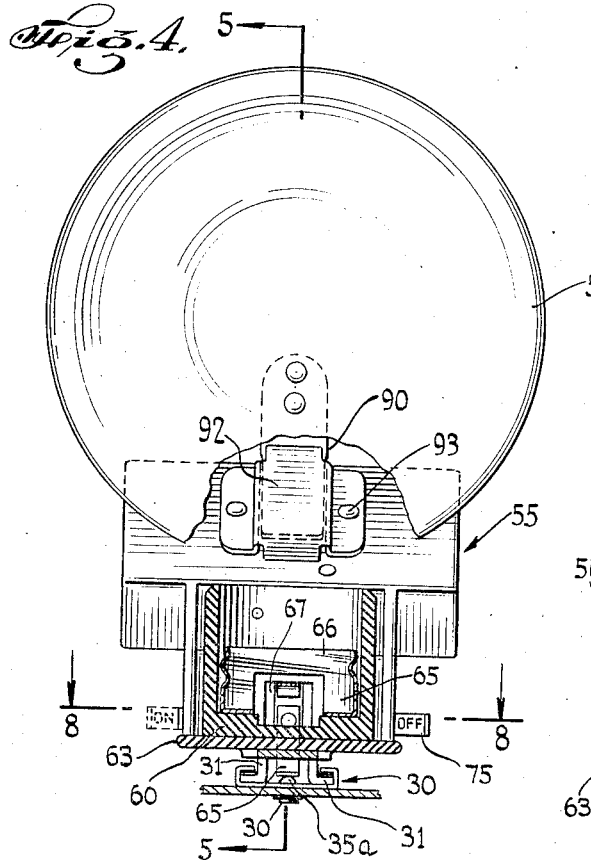
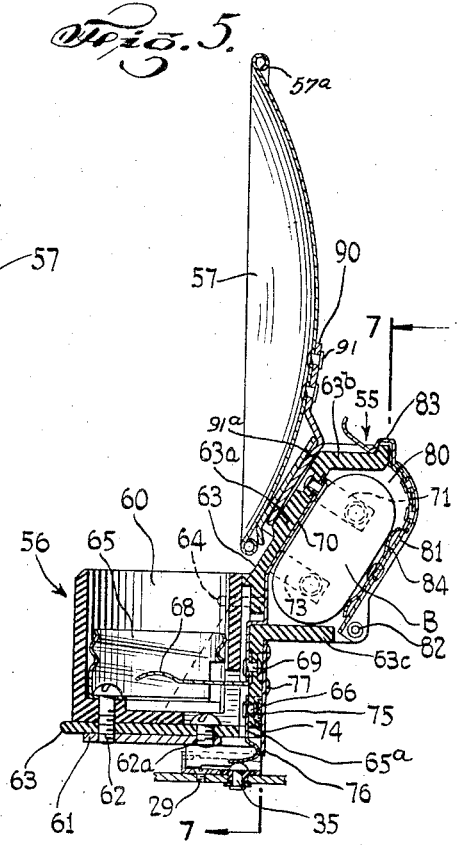
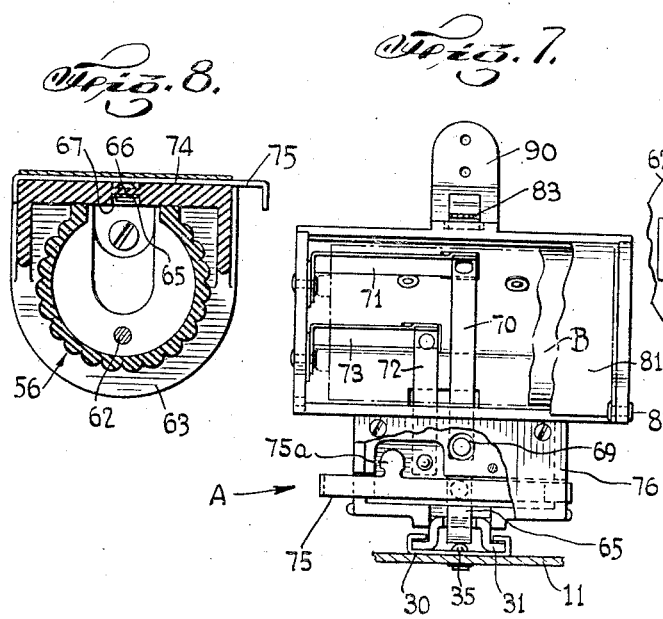
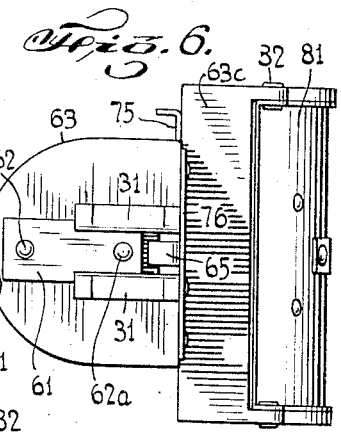
INVENTORS
GEORGE KENDE
PHILIP J. BROWNSCOMBE
BY
ATTORNEY Patented Mar. 24, 1942

2,277,233

UNITED STATES PATENT OFFICE 2,277,233

CAMERA

George Kende, New York, N. Y., and Philip J. Brownscombe, East Orange, N. J., assignors to Universal Camera Corporation, New York, N. Y., a corporation of Delaware Application January 6, 1939, Serial No. 249,568

3 Claims. (Cl. 67—29)

This invention relates to cameras. More particularly our invention relates to an improved camera construction designed for cooperative use with an improved photo-flash unit.

One of the objects of our invention is to provide an improved camera construction of the character described having built-in photo-flash synchronizing mechanism which is so designed that hanging wires may be dispensed with, which is always in proper adjustment for cooperative use with a detachable photo-flash unit, and which provides the maximum light peak from the flash lamp at the instant the shutter opening is centralized with the film frame to be exposed.

Another object of our invention is to provide in a camera built-in photo-flash synchronizing mechanism of the character described and a photo-flash unit specifically designed for cooperation therewith, which shall comprise relatively few and simple parts, which shall be easy to assemble, which shall be relatively inexpensive to manufacture and which shall, at the same time, operate with a high degree of efficiency.

Still another object of our invention is to provide an improved photo-flash unit of the character described having means whereby the accidental or otherwise undesired activation of the flash lamp will be prevented.

Other objects of this invention will in part be obvious and in part hereinafter pointed out.

Certain features described but not claimed in this application are described and claimed in our co-pending application Serial No. 245,424, filed December 13, 1938, for Cameras, now Patent No. 2,233,390 granted Feb. 25, 1941.

The invention accordingly consists in the features of construction, combinations of elements, and arrangement of parts which will be exemplified in the construction hereinafter described, and of which the scope of application will be indicated in the claims.

In the accompanying drawings, in which is shown one of the various possible embodiments of this invention, Fig. 1 is a front elevational view of an assembled photo-flash unit and camera constructed in accordance with our invention;

Fig. 3 is an enlarged cross-sectional view taken substantially on the line 3—3 of Fig. 2;

Fig. 4 is a front elevational view, partly sectional, of the photo-flash unit shown in Fig. 1;

Fig. 5 is a cross-sectional view taken substantially on the line 5—5 of Fig. 4;

Fig. 6 is a bottom plan view of the unit illustrated in Fig. 5;

Fig. 7 is a cross-sectional view taken substantially on the line 7—7 of Fig. 5; and Fig. 8 is a cross-sectional view taken substantially on the line 8—8 of Fig. 4.

Figure 1:
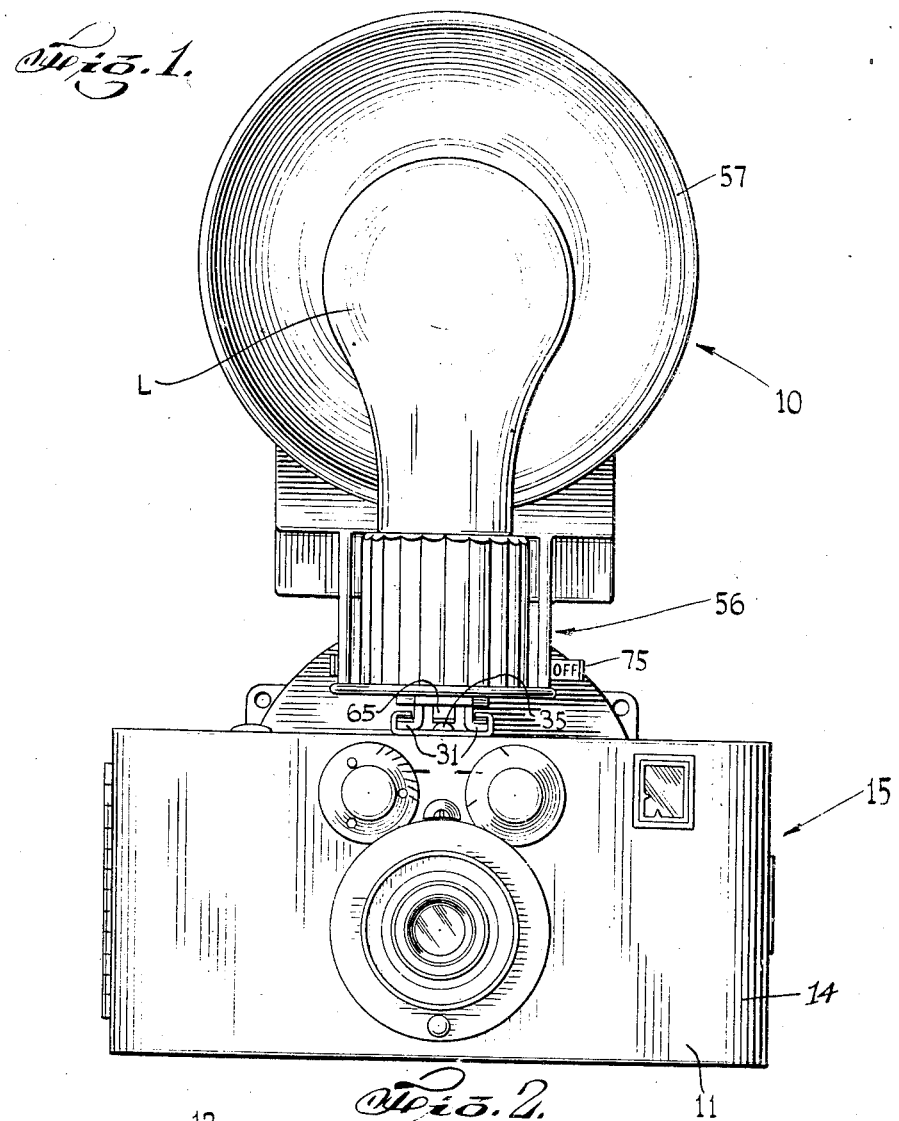
Figure 2:
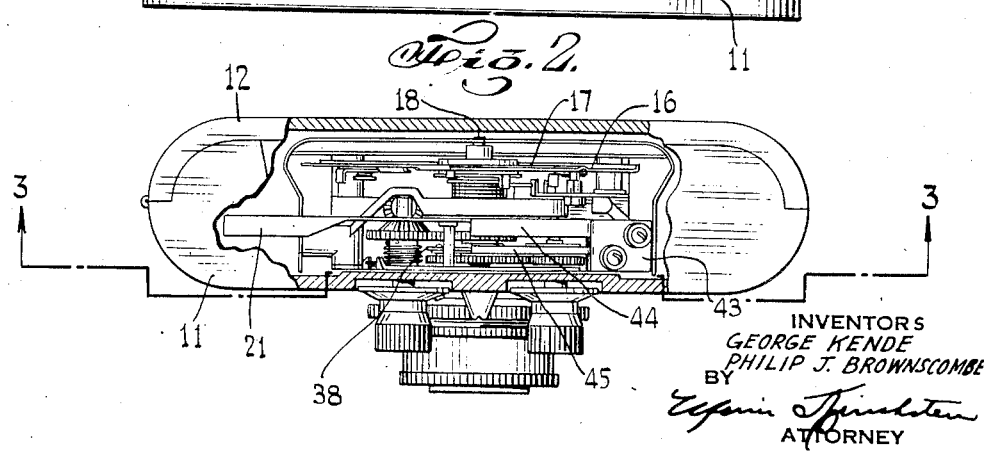
Fig. 2 is a top plan view of the camera shown in Fig. 1 but with the photo-flash unit removed and with a portion of the casing broken away to disclose the built-in photo-flash mechanism.

Referring now in detail to the drawings there is disclosed a photo-flash unit 10 constructed in accordance with our invention so that it is adapted for cooperative use with a camera 15 without the disadvantage of having hanging wires found necessary in constructions heretofore employed.

The camera 15 may be of any well known type, such as for example, the so-called "candid" camera, illustrated and described in our said co-pending application Serial No. 245,424, which comprises a pair of casing parts 11 and 12 pivotally interconnected to form a hollow casing 14 adapted to house the camera parts and operating mechanism therefor. Included in such camera parts is a spring actuated shutter made up of a pair of substantially symmetrical semi-circular plates 16 and 17 disposed in overlapping relationship and rotatable about a common axis or shaft 18 mounted in the camera casing 14, as shown in Fig. 3 of the drawings. Suitable mechanism is provided for relatively rotating the plates 16 and 17, such as for example, by having one shutter plate 16 fixed to said shaft 18 for rotation therewith and manually rotating the plate 17 relatively thereto to provide a shutter opening 20 of any desired size. The plates 16 and 17 are so designed that they will normally rotate as a unit with the shaft 18 when actuated by the said spring. The shutter is designed to be normally held against rotation until a release lever 21 is actuated by a starting button 22 or starting plunger 23, as fully explained in our said co-pending application Serial No. 245,424. In order to provide the maximum light peak from the flash lamp at the instant the shutter opening 20 is centralized with the film frame to be exposed, we provide the following mechanism which is permanently built in to the camera and which is designed for cooperative use with a photo-flash unit hereinafter to be described:

Fixed to the outer surface of the top wall of the camera casing and disposed substantially centrally thereof is a clip 30 designed to releasably mount the photo-flash unit 10 on the camera. The clip 30 may comprise a flat portion 30a overlying the casing wall and a pair of opposed upwardly and inwardly extending arms 30b forming a guideway within which to slidably receive a cooperating member 31 of the photo-flash unit 10. Any suitable means may be employed for permanently fastening the clip 30 to the camera 15, such as for example, flat head screws 29° (see Fig. 5). An electrical contact member or rivet 35 passing through the clip portion 30a is fixed to the camera casing with the rivet head 35a projecting above the top surface of the clip portion 30a. The contact rivet 35 is suitably electrically insulated from the camera casing by such means as an insulating bushing 36 and an insulating washer 37.

Mounted on the shaft 18 for integral rotation with the top shutter plate 16 is a substantially circular cam 38 having a predetermined portion 38a thereof of larger diameter, as shown in Fig. 3 of the drawings. The cam 38 is so positioned with respect to the shutter plate 16 that there will always be a fixed relationship between the leading edge 16a of the shutter blade 16 and the enlarged cam portion 38a.

Since, as shown diagrammatically in Fig. 3, the clip 30 is connected to one terminal of the battery B through the flash lamp L by the lead lines 39 and 40 and the other battery terminal is connected to the contact rivet 35 through a switch S by the lead lines 41 and 42, it is seen that in order to complete the circuit to effectively flash the lamp L, electrical contact must be established between the said clip 30 and the contact rivet 35. To accomplish this, we have provided an electrical contact spring 43 having two legs 44 and 45, and which is permanently fixed to a projection 46 of a bearing plate 47 constituting a support for certain of the camera operating mechanism. Any suitable fastening means may be employed, such as for example, the screws 48.

The contact spring 43 is electrically insulated from the bearing plate 47 by the bushing 49 and the plate 50, both of which are made of suitable insulating material. The contact spring leg 44 is designed to contactively engage the contact rivet 35 at all times, as shown. The contact spring leg 45 is provided adjacent the free end thereof with a curved portion 45a which is so disposed as to be always spaced from the periphery of that portion of the cam 38 which is of lesser diameter but which will resiliently engage the periphery of the enlarged cam portion 38a.

It is thus seen from the above described construction that when the release lever 21 is pressed downwardly to cause rotational movement of the spring wound shutter in a counter-clockwise direction (as seen from the front of the camera), the cam 38, which is mounted for integral rotational movement with the shutter, will likewise rotate in a counter-clockwise direction. When the enlarged diameter cam portion 38a strikes the contact spring finger portion 45a, the electrical circuit from the battery B to the lamp L will be completed to cause the said lamp to flash. The above mechanism is so designed that there is a fixed relation between the radial position of the leading edge 16a of the shutter plate 16 and the rise 38a on the periphery of the cam 38, so that the maximum light peak from the flash lamp L will occur at the instant the sectoral shutter opening 20 is centralized with respect to the light aperture 25.

While in the above described construction we have disclosed a shutter comprising a pair of plates 16 and 17 normally rotatable as a unit about a common axis, and being adapted to be manually relatively rotated to form a shutter opening 20 therebetween, it is understood that our invention may be satisfactorily employed in connection with cameras having other types of shutters, and that our invention extends to such use.

In accordance with our invention, we have provided a photo-flash unit 10, designed for cooperative use with the photo-flash mechanism built in the camera 15 as above described.

The photo-flash unit illustrated in Figs. 1 and 4 to 8, inclusive, comprises generally a battery housing 55, a lamp socket portion 56 and a reflector 57, interconnected to form a single compact photo-flash unit 10. The socket portion 56 comprises a cup-shaped member 60 which may be made of Bakelite or the like and which is fixed to a base member 61 by the screw 62. The member 60 is also held in assembled relationship with the main supporting frame 63, forming a wall of the battery housing 55, by the screw 64. A screw shell 65 adapted to receive the flash lamp L therein is held firmly in position by the screw 62. The base member 61 is fixed to the main supporting frame 63 by the screws 62 and 62a. A resilient electrical contact member 65a adapted to contactively engage the camera contact rivet 35 is fixed to the main supporting frame 63 by a hollow rivet 66, and is prevented from lateral displacement by a pair of vertical ribs 67 in the wall of the frame 63 (see Fig. 4).

A contact member 68 adapted to make electrical contact with the flash lamp L is fixed to the frame 63 by the hollow rivet 69, and may be held against lateral displacement in the same manner as the contact member 65a. Connector members 70 and 71 of electrically conductive material interconnect one terminal of the battery B and the lamp contact member 68. The other terminal of the battery B is connected to the contact member 65a by means of the connector members 72 and 73 of electrically conductive material, and a movable switch bar 75 adapted to break the circuit from the battery B to the lamp L to prevent undesired flashing of the lamp L. The switch bar 75 is slidably mounted in a recess 74 in the main frame 63 and is prevented from falling out of said recess 74 by a back plate 76 fastened to the main frame 63 by the screws 77. The switch bar is provided with a projecting portion 75a which is so positioned as to contactively engage the connector 72 when slidably moved to the proper position. In Fig. 7 of the drawings the switch bar 75 is shown in "off" or ineffective position. To effectively close the circuit between the contact members 65, 68 the lamp L and the battery B, it is necessary to slidably move the switch bar 75 in the direction of the arrow A until the projection 75a contacts the connector 72.

The battery B is mounted in a battery compartment 80 comprising portions 63a, 63b and 63c of the main frame 63 forming three walls of the compartment, and a cover 81 pivotally mounted on the pivot 82 forms the fourth wall of the compartment 80, thus completely enclosing the battery B. A resilient lock member 83 maintains the cover 81 tightly in position, and a spring 84 mounted on the cover 81 and pressing against the battery B prevents the battery from moving freely in its compartment and serves to make firm contact between the battery terminals and the connector members 71 and 73. It is thus seen that the battery may be readily replaced by unlatching the lock 83 and swinging the cover back on its pivot 82.

The base member 61 is provided with extensions 31 designed to be slidably received in the guideways of the clips 30 and to be frictionally held therein, to thereby mount the photo-flash unit 10 on the camera 15 for effective use. When the photo-flash unit has thus been mounted in effective position, it is noted that the contact member 65 will frictionally contact the head 35a of the contact rivet 35. With the switch bar 75 in effective or "on" position, it is seen that the circuit for actuating the flash lamp L will not be effectively completed until the camera shutter has been released for rotation, and the enlarged diameter cam portion 38a has contactively engaged the contact arm 45 in the camera. With the switch bar 75 in "off" position, the electrical circuit will be broken and no flashing of the lamp L can take place.

In accordance with our invention, we have incorporated the switch 75 into the flash unit 10 as a safety factor. Thus, for example, should the camera shutter be accidentally activated, the lamp L will not flash if the switch is in "off" position. Also, an accidental short circuit between the base member 61 and the contact member 65 or the contact rivet 35 could not occur if the switch is in "off" position. The switch 75 is designed so as to be moved to "on" position only when a picture is about to be taken.

Any suitable reflector 57 well known in the art may be provided, which is fastened to a supporting member 90 by rivets 91. The member 90 comprises a tongue portion 91a offset from the main portion thereof and which is slidably received and frictionally held in a pocket of a reflector clip member 92 fixed to the main frame 63 by the rivets 93. The reflector 57 is provided with a marginal bead 57a, and the clip member 92 is so designed that when the tongue 91a of the support 90 is forced into the pocket of the clip, the bead 57a will snap into position over the lip at the lower end of the clip 92. The reflector will thus be prevented from falling out of the clip 92 when the unit is held upside down, and at the same time will be held against wobbling.

Any suitable type of flash lamp L may be employed.

It will thus be seen that there is provided a device in which the several objects of this invention are achieved, and which is well adapted to meet the conditions of practical use.

As various possible embodiments might be made of the above invention, and as various changes might be made in the embodiments above set forth, it is to be understood that all matter herein set forth or shown in the accompanying drawings is to be interpreted as illustrative and not in a limiting sense.

Having thus described our invention, we claim as new and desire to secure by Letters Patent:

1. A built-in photo-flash synchronizing mechanism for use in a camera which includes a rotary shutter having an adjustable opening adapted to move past a film aperture in the camera, said mechanism comprising an electrical switch member having a circular segmental portion, means permanently and positively interconnecting said shutter and said switch member to rotate said member synchronously with said shutter, the leading edge of said segmental portion being disposed in fixed predetermined relationship relative to the leading edge of the adjustable opening in said shutter, a contact disposed in the path of travel of the circular periphery of said segmental portion to contact said periphery and close an energizing circuit for said photo-flash through said switch member and said contact, and means to lightly resiliently urge said contact towards said segmental portion in a direction normal to the circular periphery thereof.

2. A built-in photo-flash synchronizing mechanism for use in a camera which includes a rotary shutter having an adjustable opening adapted to move past a film aperture in the camera, said mechanism comprising an electrical switch member having a circular segmental portion, means permanently and positively interconnecting said shutter and said switch member to rotate said member synchronously with said shutter, the leading edge of said segmental portion being disposed in fixed predetermined relationship relative to the leading edge of the adjustable opening in said shutter, a contact disposed in the path of travel of the circular periphery of said segmental portion, said contact being so arranged relative to said portion as to initially contact the circular periphery thereof before said opening moves past said aperture to close an energizing circuit for said photo-flash, whereby to provide a maximum light peak from the photo-flash when said shutter opening is centralized with respect to said aperture, and means to lightly resiliently urge said contact towards said segmental portion in a direction normal to the circular periphery thereof.

3. A built-in photo-flash synchronizing mechanism for use in a camera which includes a rotary shutter having an adjustable opening adapted to move past a film aperture in the camera, said mechanism comprising an electrical switch member having a circular segmental portion, means permanently and positively interconnecting said shutter and said switch member to rotate said member synchronously with said shutter, the leading edge of said segmental portion being disposed in fixed predetermined relationship relative to the leading edge of the adjustable opening in said shutter, a resilient tongue supported in said camera and tangentially disposed with respect to the circular periphery of said segmental portion, said tongue having a contact member thereon which is disposed in the path of travel of the circular periphery of said segmental portion to resiliently contact said periphery in a light frictional wiping engagement and close an energizing circuit for said photo-flash through said switch member and said contact.

GEORGE KENDE.
PHILIP J. BROWNSCOMBE.